United States Patent
Gupta et al.

(10) Patent No.: US 9,106,321 B2
(45) Date of Patent: Aug. 11, 2015

(54) RECEIVE FILTERS TO MINIMIZE SIDE LOBES IN A UWB SYSTEM

(71) Applicant: QUALCOMM Incorporated, San Diego, CA (US)

(72) Inventors: Alok Kumar Gupta, Encinitas, CA (US); Siavash Ekbatani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 14/042,537

(22) Filed: Sep. 30, 2013

(65) Prior Publication Data

US 2015/0092821 A1    Apr. 2, 2015

(51) Int. Cl.
H04B 1/00     (2006.01)
H04B 1/719    (2011.01)
H04B 1/7163   (2011.01)

(52) U.S. Cl.
CPC ............ *H04B 1/719* (2013.01); *H04B 1/71637* (2013.01)

(58) Field of Classification Search
CPC ...... H04B 1/707; H04B 1/7163; H04B 1/719; H04B 1/71637; H04B 1/70757; H04B 1/7097; H04B 1/7172; H04B 2201/709709; H04B 1/7101; H04J 13/00
USPC ......... 375/130, 147, 148, 142, 140, 141, 152, 375/143, 346, E1.02; 342/379; 455/63.1
See application file for complete search history.

(56) References Cited

U.S. PATENT DOCUMENTS

| | | | |
|---|---|---|---|
| 5,825,812 A * | 10/1998 | Babitch | .................. 375/146 |
| 5,909,384 A | 6/1999 | Tal et al. | |
| 7,113,491 B2 | 9/2006 | Graziano et al. | |
| 7,424,405 B2 | 9/2008 | Eriksson | |
| 2005/0068932 A1 | 3/2005 | Lakkis | |
| 2011/0058597 A1 | 3/2011 | Huckett et al. | |

FOREIGN PATENT DOCUMENTS

WO    WO-2007110857 A2    10/2007

OTHER PUBLICATIONS

Axelsson, Improved Clutter Suppression in Random Noise Radar, German Institute of Navigation, 1998, 6 pgs.
Zeng et al, "Pulse Shaping Filter Design in UWB System," 2003 IEEE Conference on Ultra Wideband Systems and Technologies, Nov. 16-19, 2003, pp. 66-70, ISBN 0-7803-8187-4, Institute of Electrical and Electronics Engineers.
ISA/EPO, International Search Report and Written Opinion of the International Searching Authority, Int'l App. No. PCT/US2014/056752, Dec. 22, 2014, European Patent Office, Rijswijk, NL, 10 pgs.

* cited by examiner

*Primary Examiner* — Rahel Guarino
(74) *Attorney, Agent, or Firm* — Holland & Hart LLP

(57) ABSTRACT

Methods, systems, and devices for maximizing signal to interference plus noise ratio of a channel in a location tracking system. The methods, systems, and device may include tools and techniques for minimizing interference from adjacent samples at a receive filter, may include relaxing constraints at a transmitter. A receive filter or set of receive, or both, filters may be determined and utilized by specifying and or determining various transmitter, receiver, and channel characteristics. The receive filter and set of filters may be determined through an iterative approach involving one or more solution metrics.

35 Claims, 11 Drawing Sheets

RECEIVE FILTERS TO MINIMIZE SIDE LOBES IN A UWB SYSTEM

BACKGROUND

In some settings, such as in indoor and enterprise environments, it may be important to easily locate various types of assets or people, or both. Examples of such settings include hospitals, retail stores, warehouses, etc. The accuracy and speed with which the location of assets or people is monitored in an indoor setting may be an important factor in determining the usefulness of the tracking system. In addition, having a tracking system that is cost effective, scalable, and that can provide continuous, accurate, and precise location monitoring is also desirable.

Different systems and devices may be used to locate assets and/or people in a particular indoor environment. An ultra-wideband (UWB) network, or some other radio frequency network deployed throughout at least a portion of the indoor environment, may be configured to perform indoor tracking. Systems may employ multiple access points (APs) placed at specific locations in the indoor environment. A location tracking tag also may be attached to each mobile asset and/or to each person to be tracked. The tag may send waveforms (e.g., beacon signals) that are received by the APs for ranging measurements to determine the distance between the tag and the APs that receive the waveforms. Once the distances between the tag and at least three different APs are obtained, triangulation or trilateration may be used to estimate the location of the asset or person to which the tag is attached.

Determining distances between APs and tags may include determining an earliest ray of a signal. This determination may be complicated by channel noise and/or interference associated with the signal. In some cases, design or regulatory constraints, or both, may limit the power with which signals may be transmitted. It may therefore be desirable to mitigate interference effects of received signals by determining adjusting either, or both, transmitter and receiver characteristics.

SUMMARY

Methods, systems, and devices that provide for selecting and utilizing receive filters to limit interference from side lobes of a received signal are described. These involve tools and techniques for determining a set of receive filters to maximize a signal to interference plus noise ratio (SINR).

Because communication channels within location tracking systems are often noisy, it may be beneficial to maximize signal transmit power. However, certain signal transmissions are regulated such that they are made within power and spectral constraints. Given the competing goals of maximizing transmit power and meeting spectral mask requirements, reducing side lobes at a receiver may allow for relaxed constraints in designing transmitter pulse shape. It is therefore possible to optimize transmissions by selecting optimal receive filters.

Selecting optimal receive filters may involve iteratively applying a solution metric based on identified transmitter characteristics and various receiver characteristics. The receiver characteristics may be selected to maximize SINR for a channel. In some cases, a set of receive filters offer increasingly lower peak and total side lobe power as the filter length is increased; but, as side lobe power decreases, signal energy loss may increase. An optimal receive filter may be selected based on varying side lobe power and signal energy loss parameters for a given situation or application.

In some embodiments, a method to minimize side lobes at a receive filter includes identifying transmit filter coefficients at a chip rate. The method may also include identifying channel characteristics of a channel to determine a number of receive filter taps to obtain a target signal to interference plus noise ratio (SINR). Additionally, the method may involve identifying receive filter coefficients at the chip rate, where the receive filter coefficients may be based on the determined number of receive filter taps. The method may further involve applying a solution metric to obtain a receive filter, and the solution metric being may be based on the identified transmit filter coefficients and the determined number of receive filter taps.

The method may also involve adjusting the number of receive filter taps to obtain a set of receive filters, the set of receive filters comprising the receive filter. It may further include selecting an optimal receive filter from the set of receive filters, where each receive filter of the set of receive filters includes a respective energy loss and a respective side lobe power; and the selection of the optimal receive filter may be based on the respective energy loss and the respective side lobe power.

In some embodiments, the method includes applying the optimal receive filter to an ultra-wideband (UWB) signal in a discrete time domain after analog to digital conversion of the UWB signal.

In some embodiments of the method the optimal receive filter corresponds to a minimum side lobe power.

Additionally or alternatively, the optimal receive filter of the method may correspond to minimum energy loss.

In some cases, the method also includes relaxing constraints of a transmitter pulse shape before the identifying the transmit filter coefficients. According to some embodiments, relaxing constraints of the transmitter pulse shape includes maximizing transmit power.

The solution metric of the method may, for example, include a least square solution.

In some cases, the identified receive filter coefficients of the method include a quantity less than or equal to the number of receive filter taps.

According to some embodiments, a system configured for minimizing side lobes at a receive filter is described. The system may include means for identifying transmit filter coefficients at a chip rate. It may also include means for identifying channel characteristics of a channel to determine a number of receive filter taps to obtain a target signal to interference plus noise ratio (SINR). In some cases, the system includes means for identifying receive filter coefficients at the chip rate; and the receive filter coefficients are based on the determined number of receive filter taps. The system may also include means for applying a solution metric to obtain a receive filter, where the solution metric may be based on the identified transmit filter coefficients and the determined number of receive filter taps.

The system may further include means for adjusting the number of receive filter taps to obtain a set of receive filters, and the set of receive filters may include the receive filter. In some embodiments, the system also has means for selecting an optimal receive filter form the set of receive filters, where each receive filter of the set of receive filters includes a respective energy loss and a respective side lobe power, and where the selection of the optimal receive filter is based on the respective energy loss and the respective side lobe power.

In some embodiments of the system, it includes means for applying the optimal receive filter to an ultra-wideband (UWB) signal in a discrete time domain after analog to digital conversion of the UWB signal. The optimal receive filter may correspond to a minimum side lobe power. In some cases, the optimal receive filter corresponds to minimum energy loss.

Additionally or alternatively, the system may include means for relaxing constraints of a transmitter pulse shape. In some embodiments of the system, the means for relaxing the constraints of the transmitter pulse shape include means for maximizing transmit power.

According to some embodiments, the solution metric of the system is a least square solution.

In other embodiments, an apparatus for minimizing side lobes at a receive filter includes: a processor; memory in electronic communication with the processor; and instructions stored in the memory. The instructions may be executable by the processor to identify transmit filter coefficients at a chip rate. The instructions may also be executable by the processor to identify channel characteristics of a channel to determine a number of receive filter taps to obtain a target signal to interference plus noise ratio (SINR). In some cases, the instructions are executable by the processor to identify receive filter coefficients at the chip rate, where the receive filter coefficients are based on the determined number of receive filter taps. The instructions may further be executable by the processor to apply a solution metric to obtain a receive filter, where the solution metric is based on the identified transmit filter coefficients and the determined number of receive filter taps.

In some embodiments of the apparatus, the instructions are further executable by the processor to: adjust the number of receive filter taps to obtain a set of receive filters, where the set of receive filters includes the receive filter. The instructions may also be executable to select an optimal receive filter from the set of receive filters, and each receive filter of the set of receive filters may include a respective energy loss and a respective side lobe power, such that the selection of the optimal receive filter is based on the respective energy loss and the respective side lobe power.

In some cases, the apparatus includes the instructions executable by the processor to apply the optimal receive filter to an ultra-wideband (UWB) signal in a discrete time domain after analog to digital conversion of the UWB signal. For example, the optimal receive filter may correspond to minimum side lobe power. In some embodiments, the optimal receive filter corresponds to minimum energy loss.

Additionally or alternatively, the apparatus may include instructions executable by the processor to relax constraints of a transmitter pulse shape before identifying the transmit filter coefficients. In some cases, the apparatus has instructions executable by the processor to relax constraints of the transmitter pulse shape so as to maximize transmit power.

According to some embodiments of the apparatus, the solution metric is a least square solution.

In some embodiments of the apparatus, the identified receive filter coefficients include a quantity less than or equal to the number of receive filter taps.

In still further embodiments, a computer-program product for minimizing side lobes at a receive filter, the computer-program product includes a non-transitory computer-readable medium storing instructions executable by a processor. The instructions may be executable to identify transmit filter coefficient at a chip rate. The instructions also may be executable to identify channel characteristics of a channel to determine a number or receive filter taps to obtain a target signal to interference plus noise ratio (SINR). In some cases, the instructions are executable to identify receive filter coefficients at the chip rate, where the receive filter coefficients are based on the determined number of receive filter taps. The instructions may also be executable to apply a solution metric to obtain a receive filter, where the solution metric being is based on the identified transmit filter coefficients and the determined number of receive filter taps.

The computer-program product may also include instructions executable by the processor to adjust the number of receive filter taps to obtain a set of receive filters, where the set of receive filters include the receive filter. The instructions also may be executable to select an optimal receive filter from the set of receive filters, where each receive filter of the set of receive filters has a respective energy loss and a respective side lobe power, the selection of the optimal receive filter being based at least in part on the respective energy loss and the respective side lobe power.

In some embodiments of the computer-program product, the instructions are further executable by the processor to apply the optimal receive filter to an ultra-wideband (UWB) signal in a discrete time domain after analog to digital conversion of the UWB signal. The optimal receive filter may, for example, correspond to minimum side lobe power and/or it may correspond to minimum energy loss.

The computer-program product may have instructions executable by the processor to relax constraints of a transmitter pulse shape before identifying the transmit filter coefficients. For example, the instructions may be executable by the processor to relax constraints of the transmitter pulse shape so as to maximize transmit power.

In some embodiments of the computer-program product, the solution metric includes a least square solution.

In some embodiments of the computer-program product, the identified receive filter coefficients include a quantity less than or equal to the number of receive filter taps.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described that provide for mitigating interference effects commonly associated with earliest path detection in location tracking systems. These include tools and techniques for selecting and utilizing a receive filter, or set of receive filters, or both, that minimize interference associated with a received signal and maximize the received signal.

The communication channels of location tracking systems are often characterized by noise and signal-degrading impedances. It therefore may be beneficial to maximize signal transmit power. In some cases, however, UWB transmissions are regulated such that UWB transmissions must be made within certain power and spectral constraints. Given the competing goals of maximizing transmit power and meeting spectral mask requirements, reducing side lobes at a receiver may allow for relaxed constraints in designing transmitter pulse shape. In other words, it may be possible to optimize UWB transmissions by selecting and utilizing optimal receive filters at UWB receivers/transceivers.

Selecting optimal receive filters from the designed filter bank may involve iteratively applying a solution metric based on identified transmitter characteristics and various receiver characteristics. The receiver characteristics may be selected in order to maximize signal to interference plus noise SINR for a channel. For example, a set of receive filters may offer increasingly lower peak and total side lobe power as the filter length is increased; and, as side lobe power decreases, signal energy loss may increase. A set of receive filters may be determined, and the set of filters may provide flexibility to select a filter that limits side lobe power subject to preferred signal energy loss parameters.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1A:
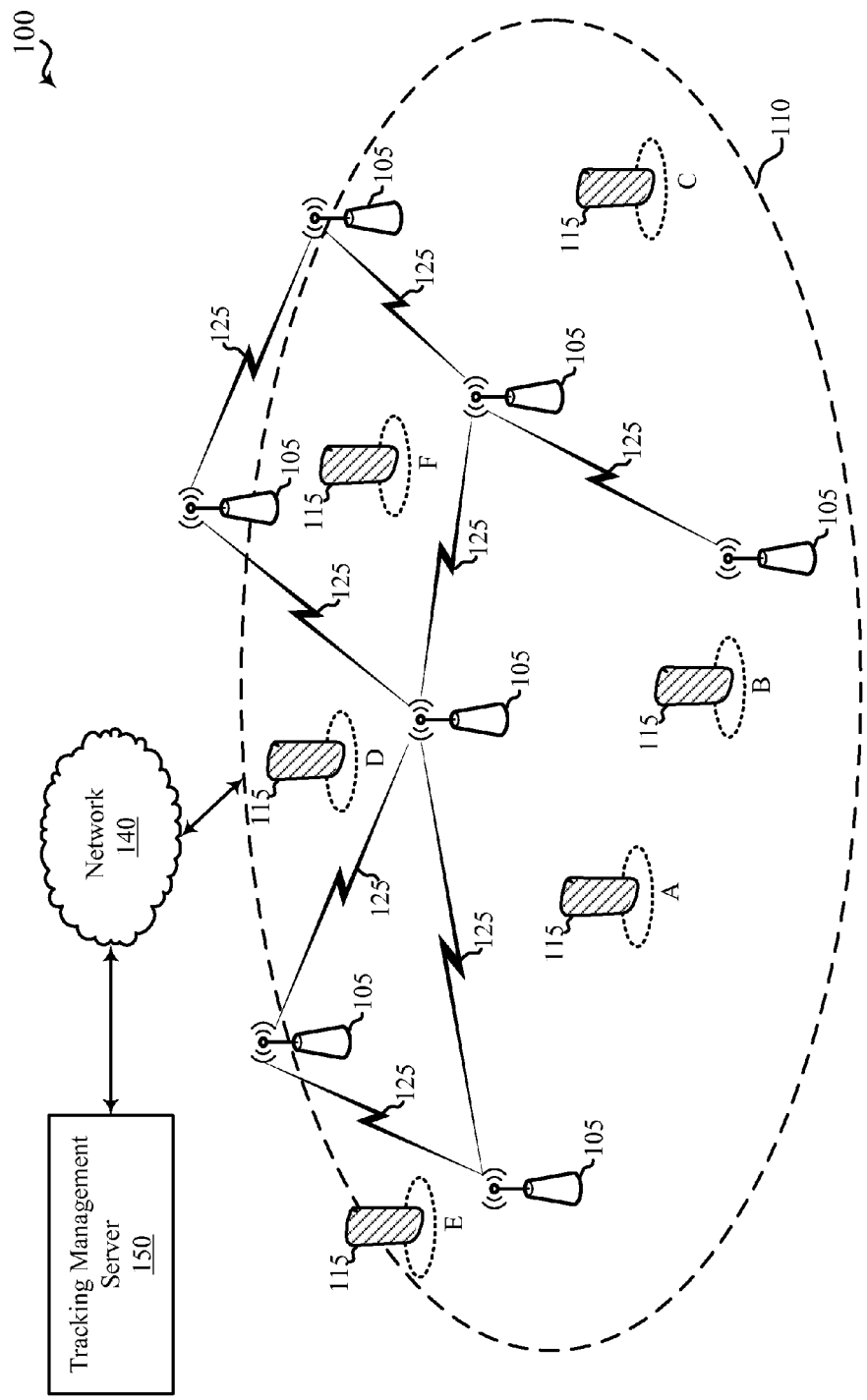
FIGS. 1A and 1B show an example(s) of a location tracking system in accordance with various embodiments.

First, FIG. 1A depicts an example of a location tracking system 100 in accordance with various embodiments. The system 100 provides location tracking of assets (e.g., objects) or people, or both, throughout the coverage area 110 associated with an indoor and/or enterprise environment. In some embodiments, the coverage area 110 represents an area of coverage inside a building, such as a hospital, a retail store, or a warehouse. Within the coverage area 110, multiple APs 105 may be deployed at specific locations, as may multiple tags 115 (also referred to as tag units and location tracking tags), which may be tracked within the coverage area 110. Because of their stationary nature, the exact distance between any two APs 105 is typically known, or may be determined, throughout the operation of the system 100. Any two APs 105 may ascertain the distance between themselves through a ranging operation, which may be a two-way ranging operation. The ranging operation may be performed via communication links 125.

The arrangement of APs 105 shown in FIG. 1A is intended as a non-limiting example. The APs 105 may be deployed or distributed within the coverage area 110 in a manner or pattern different from that depicted in FIG. 1A. For example, the APs 105 may be arranged at different distances from one another. In some cases, the coverage area 110 represents a two-dimensional deployment, such as a single floor within a building. But in some embodiments, the APs 105 are deployed in a three-dimensional manner by placing some of the APs 105 on different floors or levels of a building within the coverage area 110.

Each of the APs 105 may be equipped with a narrowband transceiver or a UWB transceiver, or both. Additionally or alternatively, the APs 105 may include one or more oscillators or timers, or both. The oscillators may each produce a repetitive, oscillating electronic signal, which may be adjustable and/or variable. The oscillators may be radio frequency (RF) oscillators. The oscillators may be linear- or relaxation-type. In some embodiments, the oscillators are voltage controlled, temperature compensated crystal oscillators (VCTCXO). The timers may include quartz clock(s), they may be digital, and/or they may be implemented in software.

The APs 105 may need to undergo a calibration procedure in order to increase the precision and/or accuracy of the tracking system 100. Calibration may include synchronizing the APs 105 to one another, to a network 140, and/or to a tracking management server 150. Additionally or alternatively, calibration may include determining coordinates of each AP 105.

In some cases, one or more APs 105 are designated or selected as master APs or acting master APs that facilitate synchronization. Network-wide synchronization of APs 105 may involve designating or selecting a master AP 105 with a stable oscillator and stable timer. Each of the other APs 105 may synchronize their respective oscillators and timers to the master AP or to an acting master AP. This synchronization may include coarse and fine synchronization steps, which, in some embodiments, involves receiving and transmitting both narrowband and UWB signals.

Calibration may also include determining the coordinates of each of the APs 105 within the coverage area 110. Coordinates of each of the APs 105 may be determined incrementally, based on known coordinates of one of the APs 105 and known or determined distances between APs 105.

Each of the tag units 115 may be attached to an asset of person being tracked within the coverage area 110. The tag units 115 may be equipped with a narrowband transceiver or a UWB transmitter, or both. The tag units 115 may also have one or more oscillators or timers, or both. The oscillators may each produce a repetitive, oscillating electronic signal, which may be adjustable and/or variable. The oscillators may be RF oscillators. The oscillators may be linear- or relaxation-type. By way of example, the oscillators are VCTCXO. The timers may include quartz clock(s), they may be digital, and/or they may be implemented in software. Those skilled in the art will recognize that the tools and techniques described herein may be implemented with oscillators of varying frequency, and timers of varying clock speeds.

FIG. 1A depicts an example location tracking system 100 with six tag units 115 at locations A, B, C, D, E, and F. Over time, these locations may change as the assets or people to which the tags 115 are attached move or are moved within the coverage area 110. The system 100, shown with six tags 115, is intended as a non-limiting example of a location tracking system. Those skilled in the art will recognize that the system 100 is scalable, and it may be capable of tracking more or fewer assets or people.

The system 100 includes a tracking management server 150, which also may be referred to as a tag tracking management server or a location tracking server. In some embodiments, the tracking management server 150 is connected to the APs 105 through a network 140. The connection may be by way of a radio network associated with the APs 105. The tracking management server 150 may receive information from the APs 105 to perform various types of calculations, including: determining one or more sets of receive filters for the APs 105; detecting whether a tag 115 is mobile or stationary and adjusting update rates accordingly; estimating characteristics of communication channels; and/or estimating a location of an asset or person being tracked within the coverage area 110. The tracking management server 150 may also schedule or coordinate various operations associated with the APs 105, including when to have an AP 105 wirelessly communicate (e.g., when to transmit UWB and/or narrowband signals) with other APs 105 or with tags 115. In some embodiments, the tracking management server 150 stores information about different APs 105 and subsets of APs 105; and it may use stored information to schedule or coordinate various operations between individual APs 105 and/or subsets of APs 105.

The APs 105 may communicate with one another by sending and/or receiving UWB signals. The channels between APs 105, which are associated with communication links 125, are often characterized by noise and signal-degrading impedances. It may therefore be beneficial to maximize UWB signal transmit power. In other words, it may be possible to optimize UWB transmissions by selecting and utilizing optimal receive filters at the APs' 105 UWB receivers/transceivers to minimize side lobes.

Selecting optimal receive filters from the designed filter bank may involve iteratively applying a solution metric, which may be based on identified transmitter characteristics and various receiver characteristics. For example, transmit filter coefficients may be identified. In some cases, the transmit coefficients depend on a chip rate. Those skilled in the art will recognize that the chip rate is a pulse rate (e.g., the number of transmitted pulses per increment of time) of a sequence. Then receiver characteristics may be selected in order to maximize SINR for a channel. For example, a number of receive filter taps may be identified such that the receive filter taps help obtain a target SINR. Receive filter coefficients may be identified. The receive filter coefficients may depend on the chip rate, and may be based on the number of receive filter taps. Then, by applying a solution metric, a receive filter may be selected from the filter bank. By way of example, the solution metric is a least square solution. The number of receive filter taps may be adjusted to obtain a set of receive filters, which approximate the least square solution, from which an optimal receive filter may be selected and utilized.

According to some embodiments, receive filter implementation may not be adaptive, and a design of filter coefficients may not depend on an incoming signal. For example, a set of filter coefficients may be drawn, with different degrees of freedom, based on the cascade response of the transmitter pulse shaping filter, the receive filter responses prior to channel estimation, and/or the receiver rate. During operation of a chip, different filter elements may be selected with different lengths from the designed filter set. In some cases, filter selection is based on conjecture of a channel condition and/or SINR. Filter selection may be performed and or dictated by APs 105.

Receive filter coefficients may be adjusted by design or interpolated based on an implementation rate of the receive filters applied before channel estimation. In some cases, receive filters may have an implementation rate greater than a chip rate, which may result in increased sub-chip accuracy.

Figure 1B:
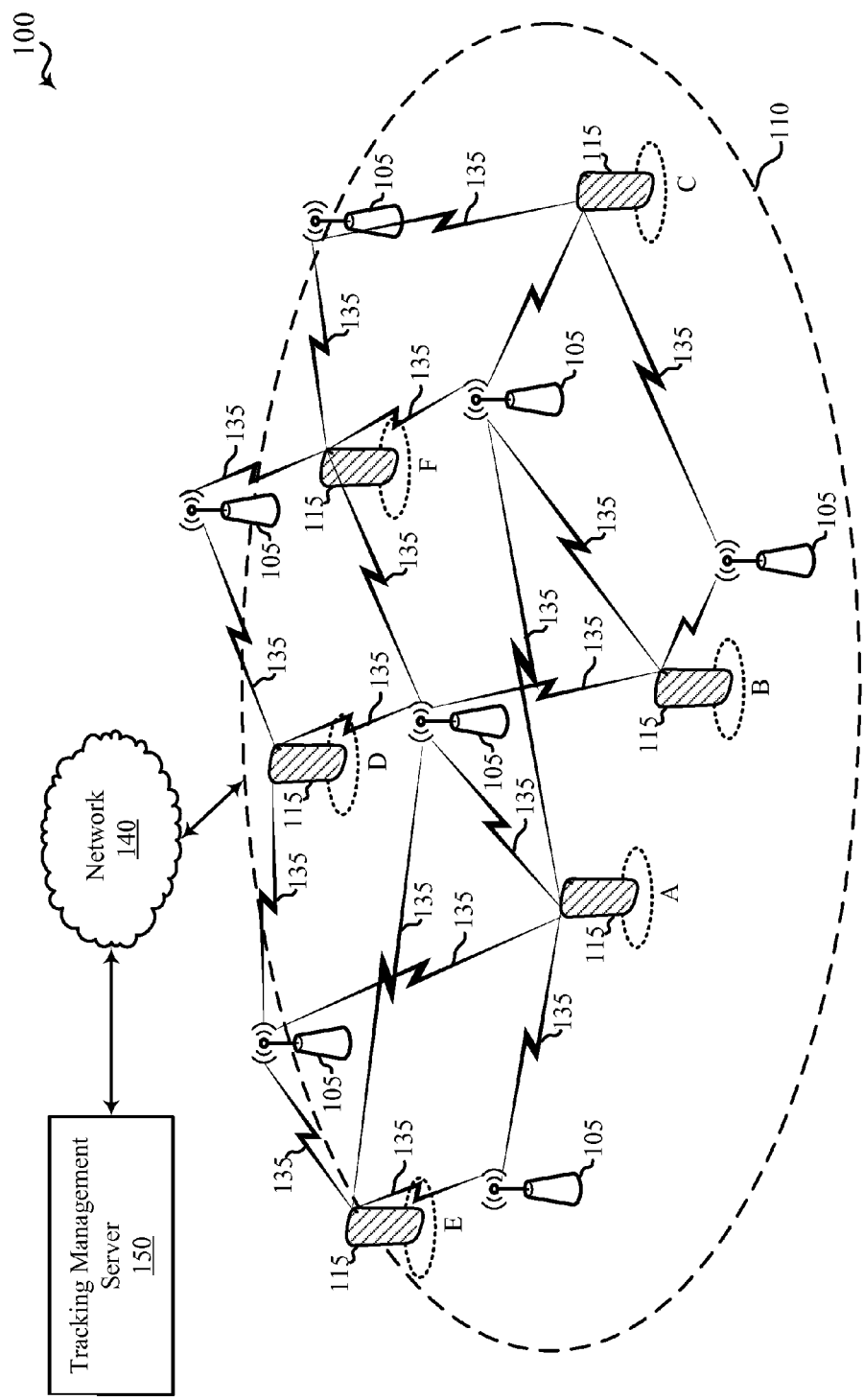

FIG. 1B illustrates transmissions or broadcasts between APs 105 and tags 115 via communication links 135. In some embodiments, the tags 115 communicate with APs 105 via the communication links 135 using either or both UWB and narrowband signals. Whether a tag 115 communicates primarily with narrowband or UWB may be a function of whether the tag 115 is mobile or stationary.

The tags 115 may communicate with APs 105 by sending and/or receiving UWB signals. The channels between APs 105 and the tags 115, which are associated with communication links 135, are often characterized by noise and signal-degrading impedances. So, as with transmission between APs 105, it may be beneficial to maximize UWB signal transmit power for communications between tags 115 and APs 105. This may be accomplished by optimizing receive filters at the receiver of the various tags 115 or APs 105, or both. It may involve iteratively applying a solution metric, which may be based on identified transmitter characteristics and various receiver characteristics. For example, transmit filter coefficients of a tag's 115 UWB transmitter may be identified. In some cases, the transmit coefficients depend on a chip rate. Then receiver characteristics of an AP's 105 UWB transceiver may be selected in order to maximize SINR for a channel. In some embodiments, a number of receive filter taps at a AP 105 UWB transceiver is identified such that the receive filter taps help obtain a target SINR for a communication link 135. Receive filter coefficients may be identified for the AP's 105 UWB transceiver. The receive filter coefficients may depend on the chip rate, and may be based on the number of receive filter taps. Then, by applying a solution metric, a receive filter may be obtained.

Figure 2A:
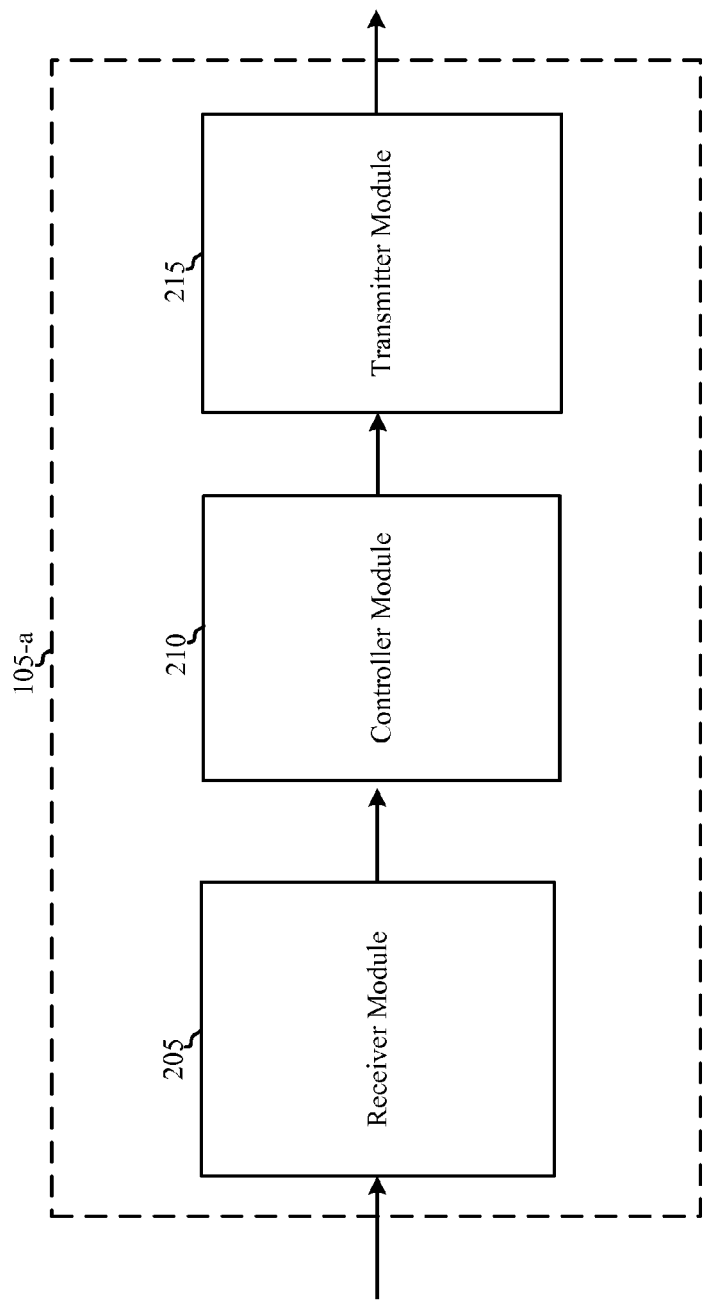
FIGS. 2A and 2B show block diagrams of example device (s) that may be employed in location tracking systems in accordance with various embodiments.

Next, turning to FIG. 2A, a block diagram illustrates a device 200 configured for communication with a location tracking system in accordance with various embodiments. The device 200 may be an AP 105-a, which may be an example of an AP 105 of FIG. 1A or FIG. 1B, or both. The device 200 may also be a processor. The device 200-a may include a receiver module 205, a controller module 210, and/or a transmitter module 215. The receiver module 205 may configured with an optimal receive filter, selected from a set of receive filters in which each filter has a respective energy loss and a respective side lobe power. The optimal receiver may allow for maximum UWB transmission power, while minimizing SINR.

The controller module 210 may process or control processing of signals received by the receiver module 205. Additionally or alternatively, the controller module 210 may process and prepare signals for transmission via the transmitter module 215.

In some cases, the transmitter module 215 is designed to maximize transmit power. For example, the transmitter module 215 may be a UWB transmitter, which may include a filter having coefficients dependent on a chip rate. The constraints of the transmitter module 215 may be relaxed—e.g., constraints of a UWB pulse transmitted from the transmitter module 215 may be relaxed, subject to certain regulatory requirements.

The receiver module 205, the controller module 210, and/ or the transmitter module 215 may be implemented in a signal device. In some embodiments, the components of the device 200 are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-Custom integrated circuits (ICs)), which may be programmed in any manner known in the art. The functions of each unit also may be wholly or partially implemented with instructions embodied in a memory, formatted to be executed by one or more general or application-specific processors.

Figure 2B:
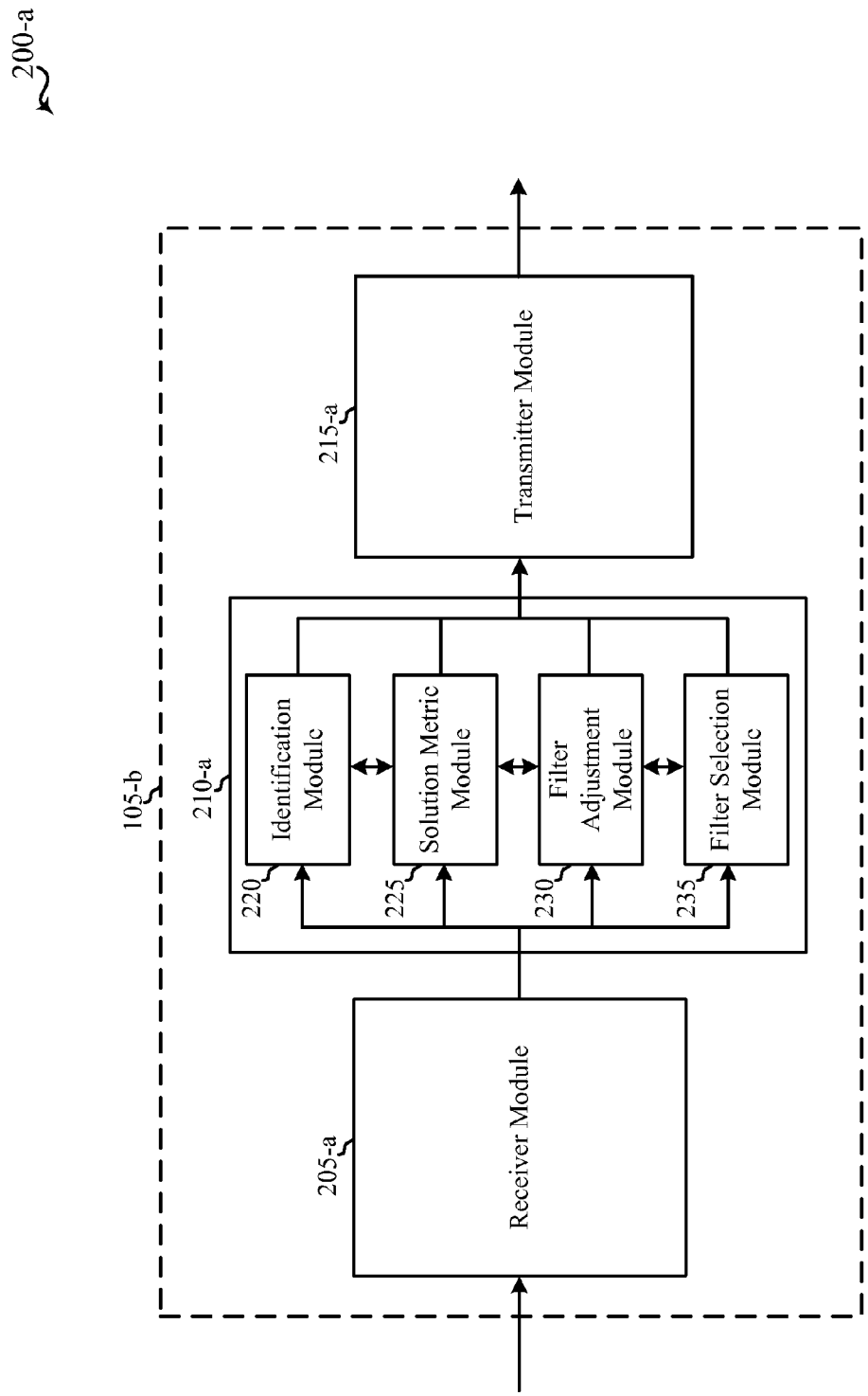

FIG. 2B shows a block diagram of a device 200-a configured for communication in a location tracking system in accordance with various embodiments. The device 200-a may be an example of the device 200 of FIG. 2A; it may also perform substantially the same functions as described with reference to FIG. 2A. The device 200-a may be an AP 105-b, which, in some embodiments, includes aspects of the APs 105 described above with reference to FIGS. 1A, 1B, and 2A. In some embodiments, the device 200-a is a processor. The device 200-a may include one or more of a receiver module 205-a, a controller module 210-a, and a transmitter module 215-a. For example, these modules may be configured to perform substantially the same functions as the corresponding modules of device 200 of FIG. 2A.

The controller module 210-a may be equipped with sub-modules configured to minimize side lobes at a receive filter. For example, the controller module 210-a may minimize side lobes at a filter of a receiver or transceiver of an AP 105 and/or a tag 115. It may minimize side lobes at a receiver module 205. The controller module 210-a may include an identification module 220, a solution metric module 225, a filter adjustment module 230, and/or a filter selection module 235. In some cases, the identification module 220 is configured to identify transmit and receive filter coefficients at a chip rate. It may also be configured to identify channel characteristics of a channel to determine a number of receive filter taps to obtain a target SINR. The solution metric module 223 may be configured to apply a solution metric to obtain a receive filter. The solution metric may be based on transmit filter coefficients and receive filter taps identified and/or determined by the identification module 220. The filter adjustment module 230 may be configure to adjust the number of receive filter taps to obtain a set of receive filters. Each filter in the set of receive filters may have or correspond to a respective signal energy loss and a respective side lobe power. The set of receive filters may include an optimal receive filter, which may correspond to minimum side lobes and/or minimum signal energy loss at a receiver. The filter selection module 235 may be configured to select the optimal receive filter from the set of filters.

The controller module 210-a may control or adjust the receiver module 205-a of the device 200-a to correspond to the selected receive filter. Additionally or alternatively, the controller module 210-a may control or adjust a receiver of one or more other APs 105. In some embodiments, the controller module 210-a is also configured to relax constraints of a transmitter pulse shape (e.g., at a transmitter module 205 and/or a transceiver of an AP 105). This may include maximizing signal transmit power to the extent allowable under governing regulations.

Figure 3:
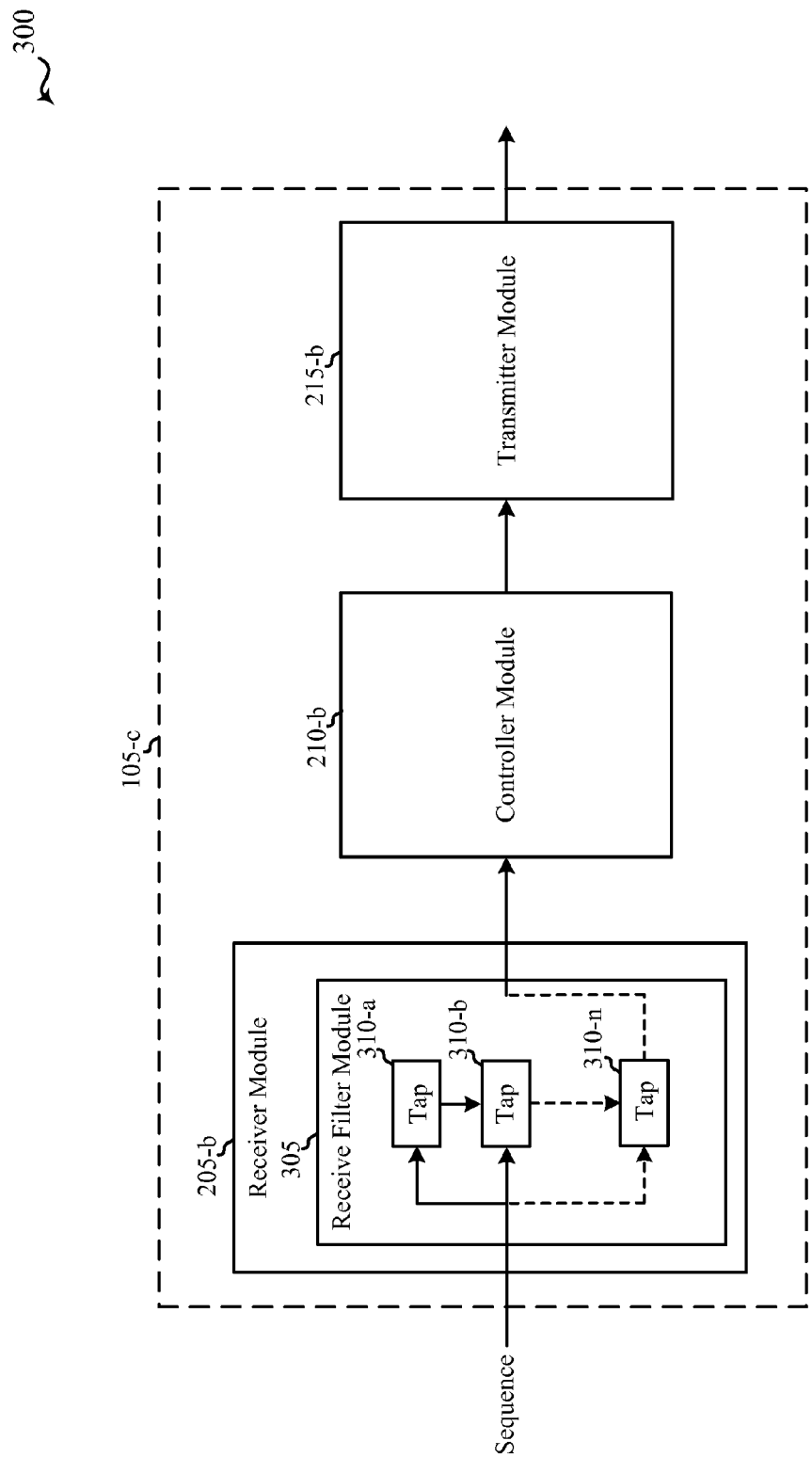
FIG. 3 shows a block diagram of an example device(s) that may be employed in location tracking systems in accordance with various embodiments.

Next, FIG. 3 shows a block diagram of a device 300 configured for communication in a location tracking system in accordance with various embodiments. The device 300 may be an example of the devices 200 and/or 200-a of FIGS. 2A and 2B; and the device 300 may perform the same or similar functions as described above for devices 200 and/or 200-a. In some embodiments, the device 300 is an AP 105-c, which may include one or more aspects of the APs 105 described above with reference to any or all of FIGS. 1A, 1B, 2A, and 2B. The device 300 may also be a processor. The device 300 may include one or more of a receiver module 205-b, a controller module 210-b, and a transmitter module 215-b. These modules may perform the same or similar functions as the corresponding modules of device 200 and/or 200-a in FIGS. 2A and 2B. The device 300 may also include a receive filter module 305, which may include one or more receive filter taps 310-a, 310-b, . . . , 310-n. The number of receive filter taps 310 may be adjusted to obtain a target SINR. An optimal receive filter value for the receive filter module 305 may be obtained by applying a solution metric based on identified transmitter coefficients and the number or receive filter taps. The receive filter module 305 may be controlled, adjusted, and/or determined by a controller module 210. For example, the controller module 210-a may control the receive filter module 305.

The receive filter module 305 may be a receiver pulse shaping filter selected to reduce side lobe levels of a combined waveform while maximizing received signal energy, and thus maximizing SINR. By way of example, the receive filter module 305 includes a filter applied to a received UWB signal in a discrete time domain, after analog to digital conversion, at a chip rate of 1.125 GHz. A sequence may be sent from a tag 115 having a UWB transmitter with N tap transmit pulse shaping filter coefficients sampled at a chip rate, which may be represented as $$C_{Tx\text{-}chipX}=[c_0 c_1 ... c_{N-1}], \quad (1)$$

where the transmit pulse shaping filter (or transmit filter) representation is normalized to have unit energy. That is $$\sum_{i=0}^{N-1} |c_i|^2 = 1. \quad (2)$$

A receive filter may be selected at the chip rate with L taps, where L≥N. The receive filter may have receive filter coefficients sampled at the chip rate, which may be represented as $$V_{Rx\text{-}chipX}=[v_0 v_1 ... v_{L-1}], \quad (3)$$

with a unit energy constraint $$\sum_{i=0}^{L-1} |v_i|^2 = 1. \quad (4)$$

A length N+L−1 transmitter-receiver ($T_x$-$R_x$) cascade response may be represented by linear convolution as $$E_{Tx\text{-}Rx}=c_{Tx}*v_{Rx}=[e_0 e_1 ... e_{N+L-2}]) \quad (5)$$

where the chip rate index is eliminated from the transmitter and receiver filter variables. A total side lobe level of the cascade response in Equation 5 may be defined as $$P_{SL,total} = |e_0|^2 + |e_1|^2 + ... + |e_{M-1}|^2 = |e_{M+1}|^2 + ... + |e_{N+L-2}|^2 \quad (6)$$

where $$M = \left\lfloor \frac{N+L-1}{2} \right\rfloor, \quad (7)$$

which is the smallest integer that is greater than or equal to (N+L−1)/2, and denotes the middle sample. In some embodiments, the middle sample represents a desirable signal. Equality of left and right hand sides of Equation 6, corresponding to side lobes, is a result of symmetry between identified and/or selected transmit and receive filters. Those skilled in the art will recognize that, in a location tracking system, an interference effect of adjacent channel rays on the earliest path may be caused by only one side of a cascaded response. Thus, Equation 6 may appropriately be defined as the total side lobe.

In some cases, a value of $v_{Rx}$ in Equation 5 that results in a minimum total side lobe level and a maximum signal level is a least square (LS) solution. The skilled artisan will note that a valid solution is bounded by the unit energy constraint of Equation 4. By way of example, the linear convolution relation of Equation 4 may be defined by matrix multiplication:

$$e_{Tx\text{-}Rx} = A v_{Rx}^T, \quad (8)$$

where $x^T$ denotes a transpose operation; and A is an (N+L−1)×N matrix, defined as $$A = \begin{bmatrix} c_0 & 0 & \cdots & & 0 \\ c_1 & c_0 & 0 & \cdots & 0 \\ \vdots & & \vdots & & \vdots \\ c_{N-1} & c_{N-2} & \ddots & & c_0 \\ \vdots & & \vdots & & \\ 0 & \cdots & & & \vdots \\ 0 & & \cdots & c_{N-1} & c_{N-2} \\ & & & 0 & c_{N-L} \end{bmatrix}. \quad (9)$$

An LS solution may thus be derived as $$v_{Rx}^{LS} = (A^T A)^{-1} A^T e_d^T, \quad (10)$$

where $$e_d = [0 \ldots 0 1 0 \ldots 0] \quad (10)$$

is the desired response with an element 1 in position M, the middle sample, and 0s elsewhere. The desired response, e.g., the LS solution, may be a result with zero interference and no energy loss.

In some case, such as where it is desirable to maximize transmit power, the receive filter length, e.g., the number of receive filter taps, L is variable while other values are specified or determined. For example, the receive filter taps 310 of the receive filter module 305 may be varied to achieve an adjustable value L.

According to some embodiments, the components of the device 300 are, individually or collectively, implemented with one or more ASICs adapted to perform some or all of the applicable functions in hardware. In other embodiments, the functions of device 300 are performed by one or more processing units (or cores), on one or more integrated circuits. In other embodiments, other types of integrated circuits are used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 4:
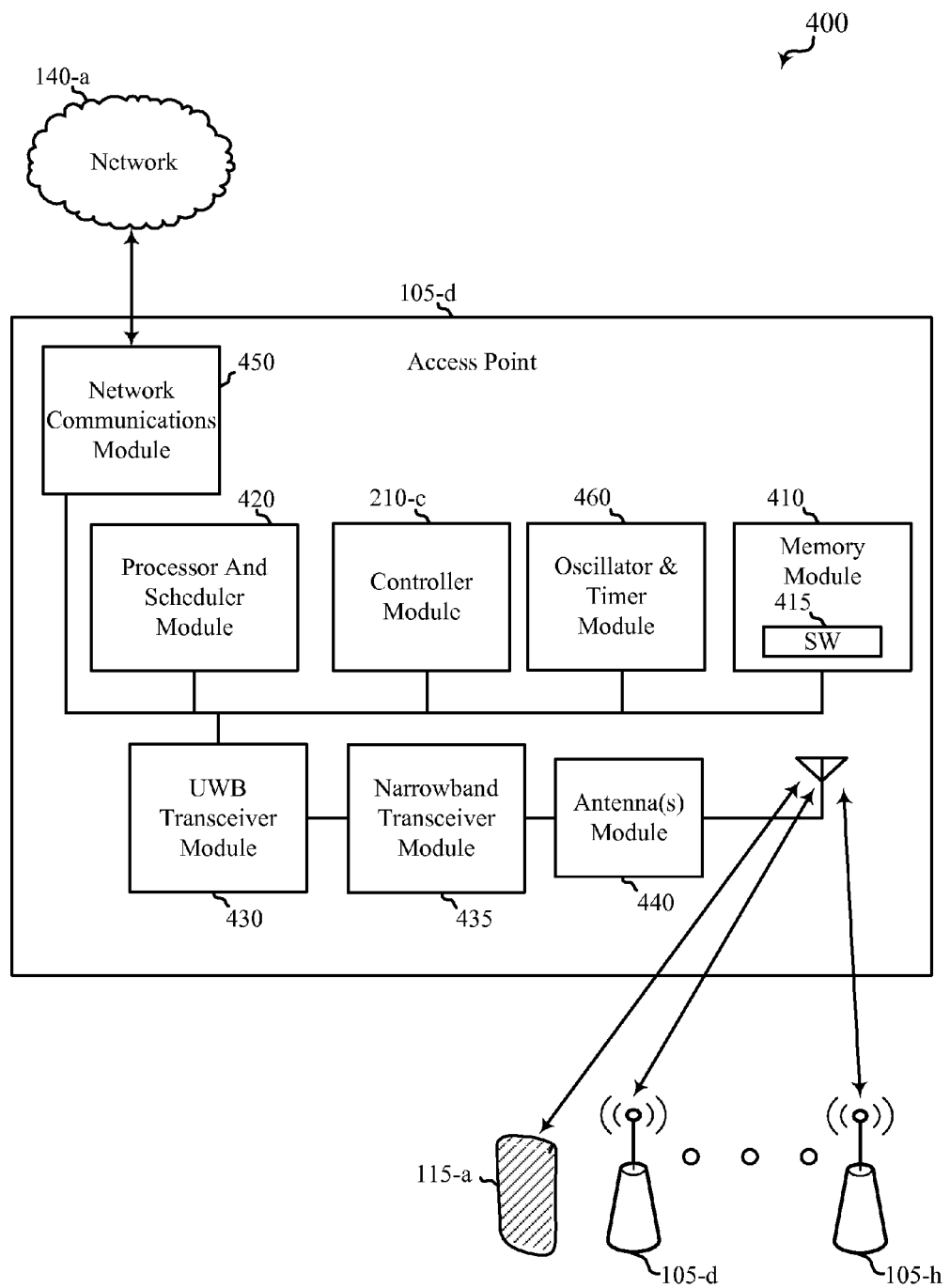
FIG. 4 shows a block diagram of an example of a location tracking system in accordance with various embodiments.

Turning now to FIG. 4, which depicts a block diagram of a system 400 configured for communication within a location tracking system in accordance with various embodiments. The system 400 may include APs 105-d, and 105-e through 105-i, which may be examples of the APs 105 described with reference to one or more of FIGS. 1A, 1B, 2, and 3. The AP 105-d may include a memory module 410, which, in some embodiments, includes a software module 415. The AP 105-d may include a processor and scheduler module 420, a UWB transceiver module 430, a narrowband transceiver module 435, antenna(s) module 440, a network communications module 450, and/or an oscillator and timer module 460. Each of the components of the AP 105-d may be in communication with each other. The network communications module 450 may be in communication with the network 140-a, which may be an example of the network 140 of FIGS. 1A and 1B.

In some embodiments, the AP 105-d also includes a controller module 210-c, which may perform substantially the same functions of the controller modules 210 of FIGS. 2A, 2B, and/or 3. For example, the controller module 210-c may be configured to minimize side lobes at a receive filter. The may include: identifying transmit filter coefficients; identifying channel characteristics to determine a target SINR; identifying receive filter coefficients; and applying a solution metric. The controller module 210-c may also adjust the number of receive filter taps to obtain a set of receive filters. And the controller module 210-c may select an optimal receive filter from the set.

The memory module 410 may include random access memory (RAM) and/or read-only memory (ROM). In some embodiments, the memory module 410 also stores computer-readable, computer executable software (SW) code 415 containing instructions configured to, when executed, cause the processor and scheduler module 420 to perform various functions related to communicating according to a determined update mode, as described herein. In other embodiments, the software (SW) code 415 may not be directly executable by the processor and scheduler module 420; but it may be configured to cause a computer, for example, when compiled and executed, to perform the functions described herein.

The processor and scheduler module 420 may include an intelligent hardware device, such as a central processing unit (CPU). The processor and scheduler module 420 may perform various operations associated with determining transmit or receive filter characteristics, or both transmit and receive filter characteristics. The processor and scheduler module 420 may use scheduling information received from, for example, the tracking management server 150, by way of the network 140-a, to determine a number of receive filter taps to apply.

Either or both of the UWB transceiver module 430 and narrowband transceiver 435 may include a modem configured to modulate data (e.g., packets) and provide the modulated data to the antenna(s) module 440 for transmission, and to demodulate data received from the antenna(s) module 440. The UWB transceiver module 430 may be an example of, or include aspects of, the devices 200 or 300, or both, of FIGS. 2 and 3. In some embodiments, the UWB transceiver module 430 includes a receive filter module that is the same as, or similar to, the receiver filter module 305. Thus, in some cases, the UWB transceiver module 430 includes receive filter taps like the taps 310. These taps may be adjusted to obtain a target SINR. Likewise, the taps may be associated with receive filter coefficients, which may be varied in conjunction with specified, identified, and/or determined transmit filter coefficients in an applied solution metric to obtain an optimal or desired receive filter value.

The UWB transceiver module 430 may include a transmitter module similar to the transmitter module 215. In some cases, the transmitter module includes variable characteristics, such as a variable pulse shaping filter, which are relaxed or constrained to account for changing channel conditions. For example, constraints of the transmit pulse shaping filter may be relaxed in order to maximize transmit power.

Some embodiments of the AP 105-c include a single antenna; other embodiments include multiple antennas. Signals transmitted from a tag 115-a may be received by the AP 105-c via the antenna(s) in the antenna(s) module 440. The AP 105-c may also wirelessly communicate with other APs, such as APs 105-d through 105-h. In some embodiments, the AP 105-c may receive signals, including UWB, narrowband, and reference signals from other APs 105; and the AP 105-c may use the received signals for calibrating, synchronizing, and/or determining a location of a tag unit 115. The narrowband transceiver module 435 may be a ZigBee radio. In some cases, the AP 105-c may transmit received signals to the tracking management server 150 (shown in FIGS. 1A and 1B) via the network communications module 450 and the network 140-a.

Figure 5:
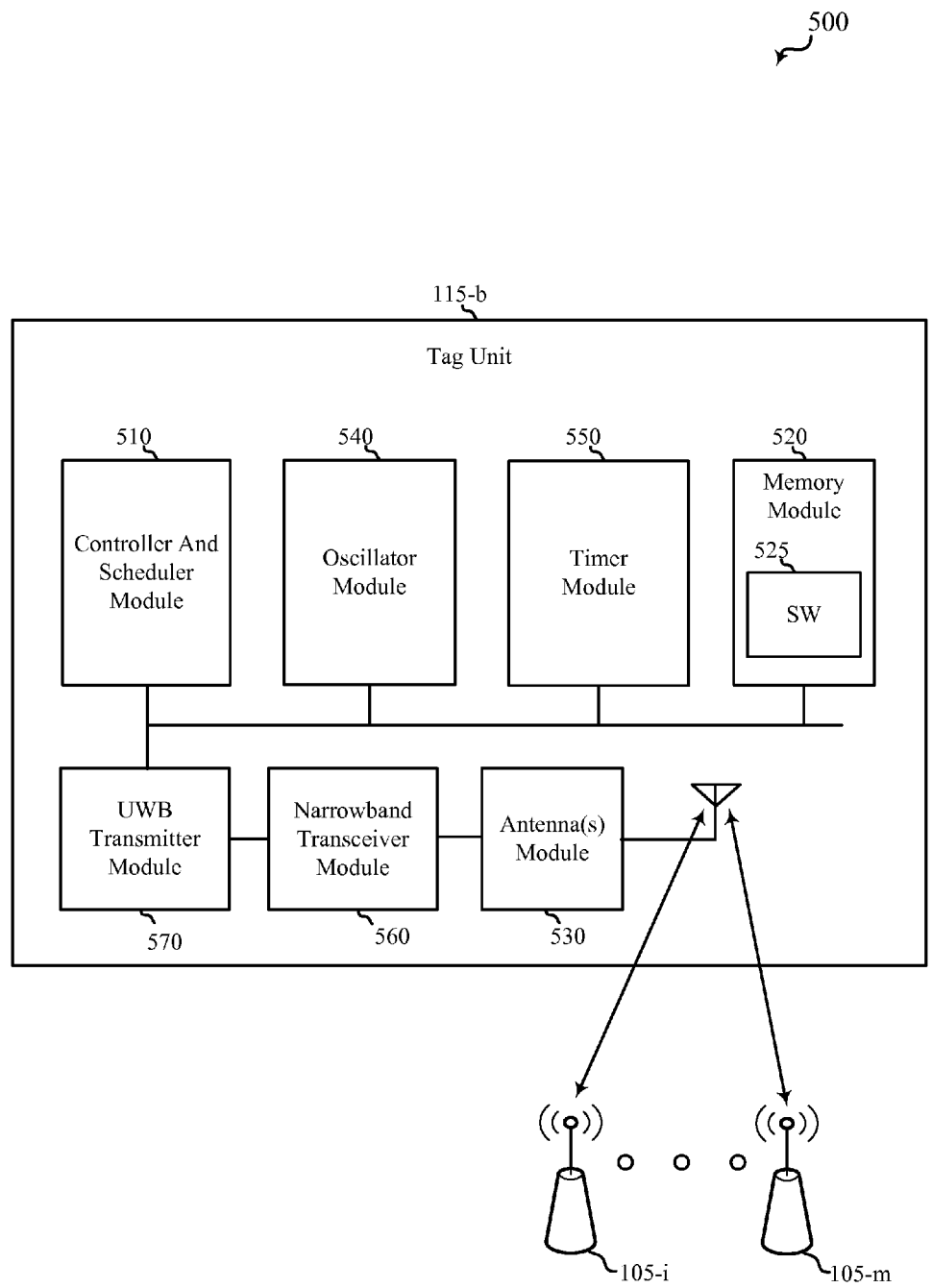
FIG. 5 shows a block diagram of an example of a location tracking system in accordance with various embodiments.

Next, FIG. 5 shows a block diagram illustrating a system 500 configured for communication within a location tracking system according to various embodiments. The system 500 may include a tag unit 115-b. In some embodiments, the tag unit 115-b includes one or more aspects of the tag units 115 of one or both of FIGS. 1A and 1B. The tag unit 115-b may include a controller and scheduler module 510, a memory module 520, which may include a software (SW) module 525, an antenna(s) module 530, an oscillator module 540, a timer module 550, a narrowband transceiver module 560, and/or a UWB transmitter module 570. The UWB transmitter module 570 may include aspects that are the same as, or similar to, the transmitter module 205 of FIG. 2A. Each of the components of the tag unit 115-b may be in communication with each other.

By way of example, the controller and scheduler module 510 includes logic or code, or both, that enables it to control the operations of the tag unit 115-b. In some cases, the controller and scheduler module 510 includes a microcontroller or a state machine to control the narrowband transceiver module 560 and the UWB transmitter module 570.

The memory module 520 may include random access memory (RAM) or read-only memory (ROM), or both. In some embodiments, the memory module 520 stores computer-readable, computer-executable software (SW) code 525 containing instructions that are configurable to, when executed, cause the controller and scheduler module 510 to perform various functions described herein for controlling the tag unit 115-b. In other embodiments, the software code 525 is not directly executable by the controller and scheduler module 510, but it may be configured to cause a computer, for example, when compiled and executed, to perform functions described herein.

The UWB transmitter module 570 may support RF communication technology to broadcast UWB signals through the antenna(s) module 530. Likewise, the narrowband transceiver module 560 may support RF communication technology to broadcast narrowband signals through the antenna(s) module 530. The UWB transmitter module 570 or the narrowband transceiver module 560, or both, may include a modulator (not shown) to modulate location tracking information and provide the modulated information to the antenna(s) module 530 for transmission of signals. In some embodiments, the narrowband transceiver module includes a ZigBee radio.

FIG. 5 shows broadcast and reception of signals between the tag unit 115-b and several APs 105. In the system 500, several APs 105-j through 105-n are shown communicating with the tag unit 115-b; but the tag unit 115-b may communicate with more or fewer APs 105. By way of illustration, the tag unit 115-b may transmit a UWB pulse, utilizing the UWB transmitter module 570, to several APs 105. The UWB transmitter module 570 may include a transmit filter configured such that the transmitted pulse is sent with maximum power, as allowed by governing regulations. The transmit filter configuration may include certain coefficients that are a function of the chip rate of the transmitted pulse. In some cases, the pulse may be an analog sequence.

The transmitted pulse may be received by APs 105, which are each configured with optimal receive filters selected from a set of filters. The set of filters may be obtained by adjusting a number of receive filter taps associated with at receiver at each AP 105. In some embodiments, the receive filters are selected to minimize side lobes at the receiver of each AP 105. This may be achieved by: identifying the transmit filter coefficients at a chip rate; identifying channel characteristics to determine a number of receive filters to obtain a target SINR; identifying receive filter coefficients at the chip rate; and applying a solution metric. By way of example, the number of receive filter taps corresponding to receive filter coefficients that yields a least square solution yields an optimal receive filter. Receive filters having similar characteristics as the optimal filter may make up a set of receive filters which may be applied to the APs 105. For example, the receive filter coefficients may be of a quantity less than or equal to the number of receive filter taps.

Figure 6:
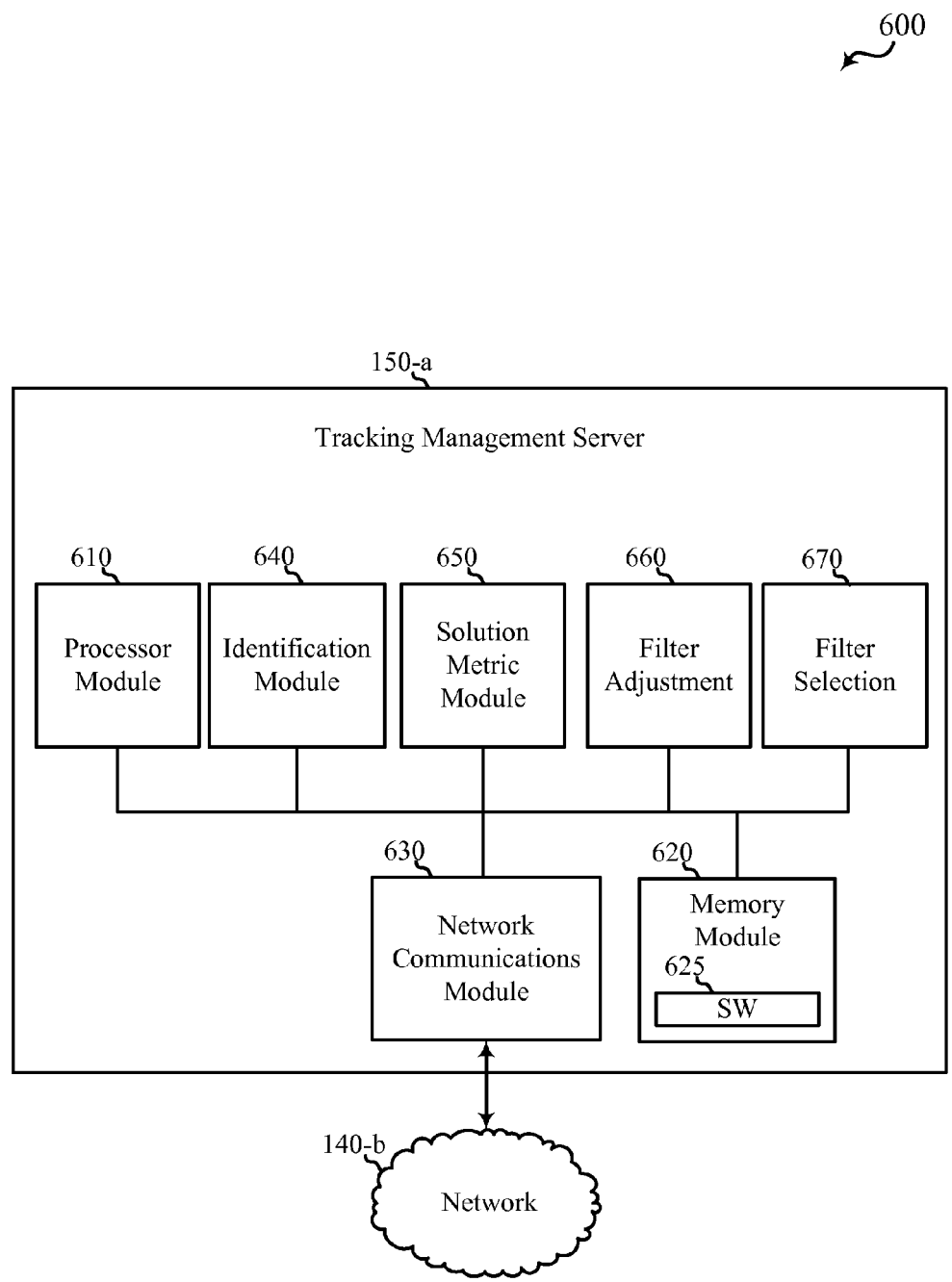
FIG. 6 shows a block diagram of an example of a location tracking system in accordance with various embodiments.

Now turning to FIG. 6, which shows a block diagram of a system 600 configured for communication within a location tracking system according to various embodiments. In some embodiments, the system 600 includes a tracking management server 150-a, which may be the tracking management server 150 of FIGS. 1A and 1B. The tracking management server 150-a may include a processor module 610, a memory module 620 (and software 625), a network communications module 630, an identification module 640, a solution metric module 650, a filter adjustment module 660, and/or a filter selection module 670.

According to some embodiments, the tracking management server 150-a may perform some or all of the functions described with reference to the controller module 210-a. For example, the tracking management server may minimize side lobes of one or more receive filters of receivers and/or transceivers within one or more APs 105. The identification module 640 may identify transmit and receive filter coefficients; and it may identify channel characteristics of a channel to determine a number of receive filter taps to obtain a target SINR. The solution metric module 650 may apply a solution metric to obtain a receive filter. The solution metric may be a least square solution. The filter adjustment module may adjust the number of receive filter taps to obtain a set of receive filters, which may include an optimal receive filter. The filter selection module 670 may select an optimal receiver from the set of receive filters.

The processor module 610 may also perform various operations related to minimizing side lobes at a receive filter; and, in some embodiments, it includes an intelligent hardware device (e.g., a CPU). The tracking management server 150-a may also communicate with a network 140-b through the network communications module 630 to send information to and/or receive information from APs 105 regarding identifying, adjusting, and/or selecting receive filter characteristics. Likewise, the tracking management server 150-a may send or receive information related to identified or identifying channel characteristics. The network 140-b may be an example of the networks 140 of any or all of FIGS. 1A, 1B, and 3.

The memory module 620 may include RAM or ROM, or both. In some embodiments, the memory module 620 stores computer-readable, computer-executable software code 625 containing instructions that are configured to, when executed, cause the processor module 610 to perform various functions described herein. In other embodiments, the software code 625 may not be directly executable by the processor module 610; but the software code 625 may be configured to cause a computer, e.g., when compiled and executed, to perform the functions described herein.

Figure 7:
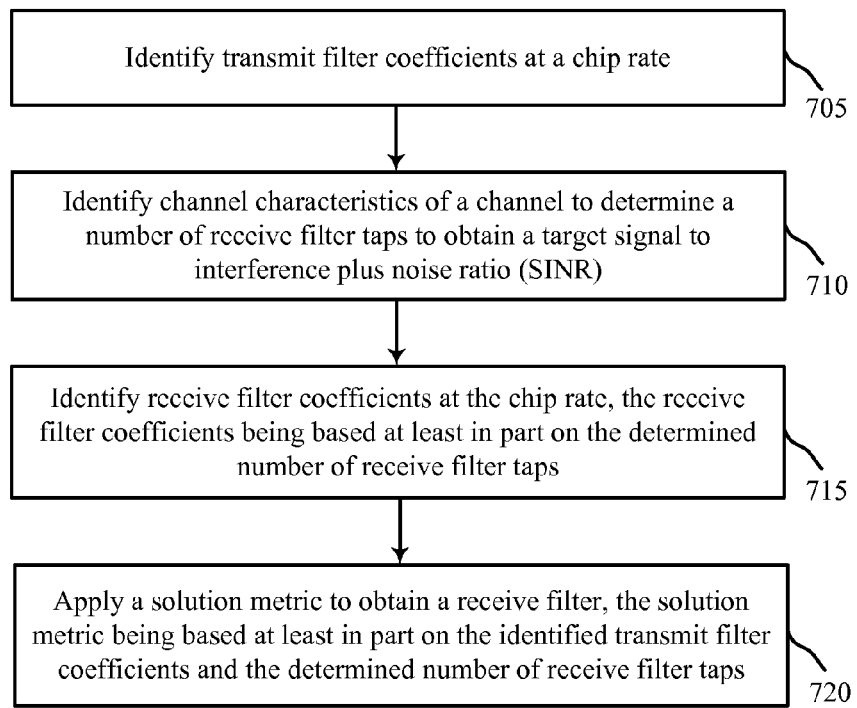
FIG. 7 is a flow diagram of a method of communication with a location tracking system in accordance with various embodiments.

Next, FIG. 7 shows a flow diagram, which illustrates a method 700 of communication with a location tracking system, according to some embodiments. By way of illustration, the method 600 is implemented using the one or more of the devices and systems 100, 200, 200-a, 300, 400, 500, and 600 of FIGS. 1A, 1B, 2A, 2B, 3, 4, 5, and 6.

At block 705, the method may involve minimizing side lobes at a receive filter by identifying transmit filter coefficients at a chip rate. According to some embodiments, at block 710, it includes identifying channel characteristics of a channel to determine a number of receive filter taps to obtain a target signal to interference plus noise ratio (SINR). At block 715, it may involve identifying receive filter coefficients at the chip rate, the receive filter coefficients being based at least in part on the determined number of receive filter taps. Then, at block 720, the method may include applying a solution metric to obtain a receive filter. The solution metric may be based on, at least in part, the identified transmit filter coefficients and the determined number of receive filter taps.

Those skilled in the art will recognize that the method 700 is but one implementation of the tools and techniques discussed herein. The operations of the method 600 may be rearranged or otherwise modified such that other implementations are possible.

Figure 8:
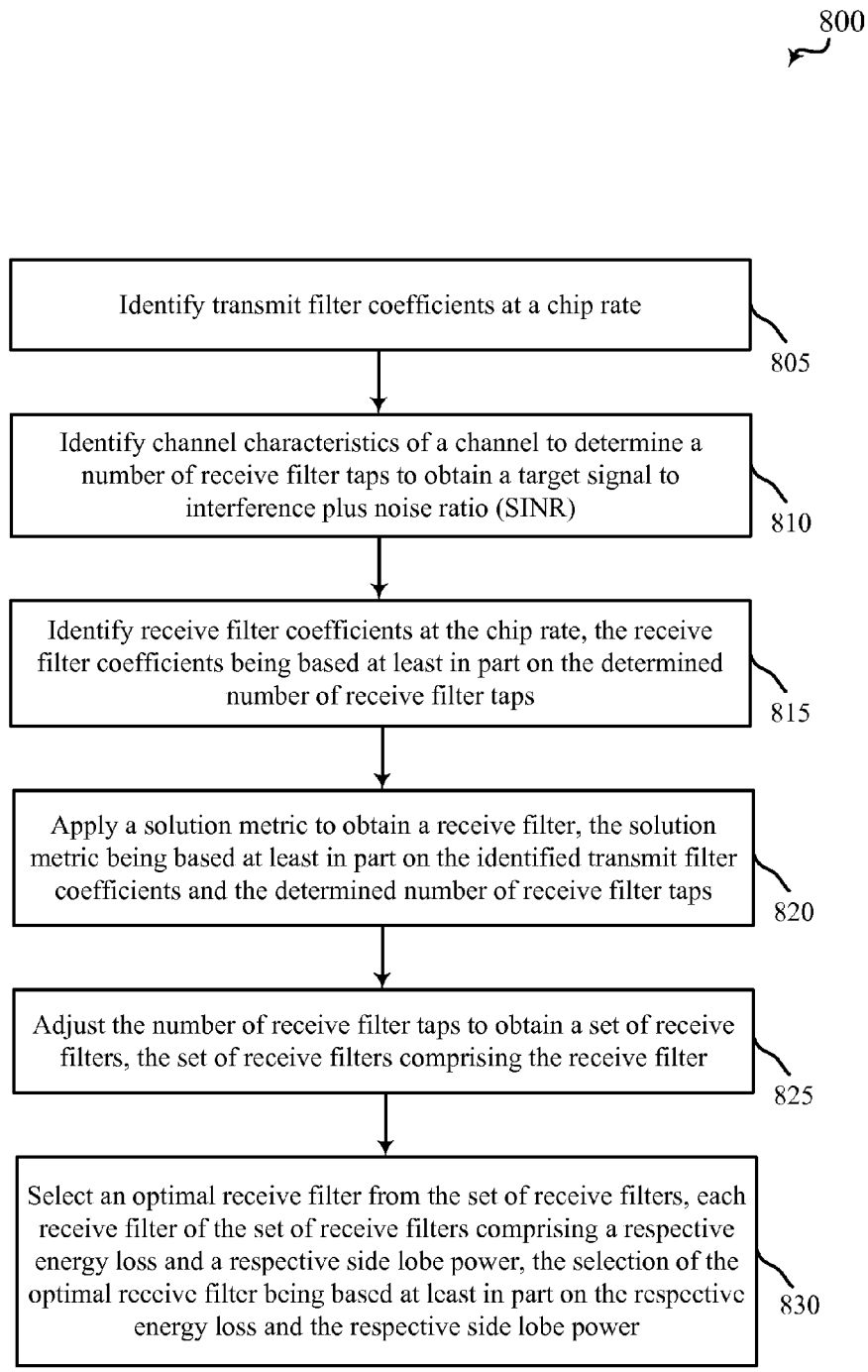
FIG. 8 is a flow diagram of a method of communication with a location tracking system in accordance with various embodiments.

FIG. 8 shows a flow diagram that illustrates a method 700 for communication within a location tracking system, according to various embodiments. The method 700 may be implemented using, for example, the devices and systems 100, 200, 200-a, 300, 400, 500, and 600 of FIGS. 1A, 1B, 2A, 2B, 3, 4, 5, and 6.

At block 805, the method may involve minimizing side lobes at a receive filter by identifying transmit filters at a chip rate. At block 810, it may include identifying channel characteristics of a channel to determine a number of receive filter taps to obtain a target SINR. That, at block 815, it may include identifying receive filter coefficients at the chip rate. The receive filter coefficients may be designed based on the determined number of receive filter taps. At block 820, the method may involve applying a solution metric to obtain a receive filter. The solution metric may be based on the identified transmit filter coefficients and the determined number of receive filter taps. The method 800 may further include, at block 825, adjusting the number of receive filter taps to obtain a set of receive filters; and the set of receive filters may include the receive filter at which the side lobes are minimized. Then, at block 830, it may include selecting an optimal receive filter from the set of receive filters. Each receive filter of the set may have a respective energy loss and a respective side lobe power; and the selection of the optimal power may be based on the respective energy loss and the respective side lobe power.

A skilled artisan will notice that the method 700 illustrates one implementation of the tools and techniques described herein. The operations of the method 700 may be rearranged or otherwise modified such that other implementations are possible.

Figure 9:
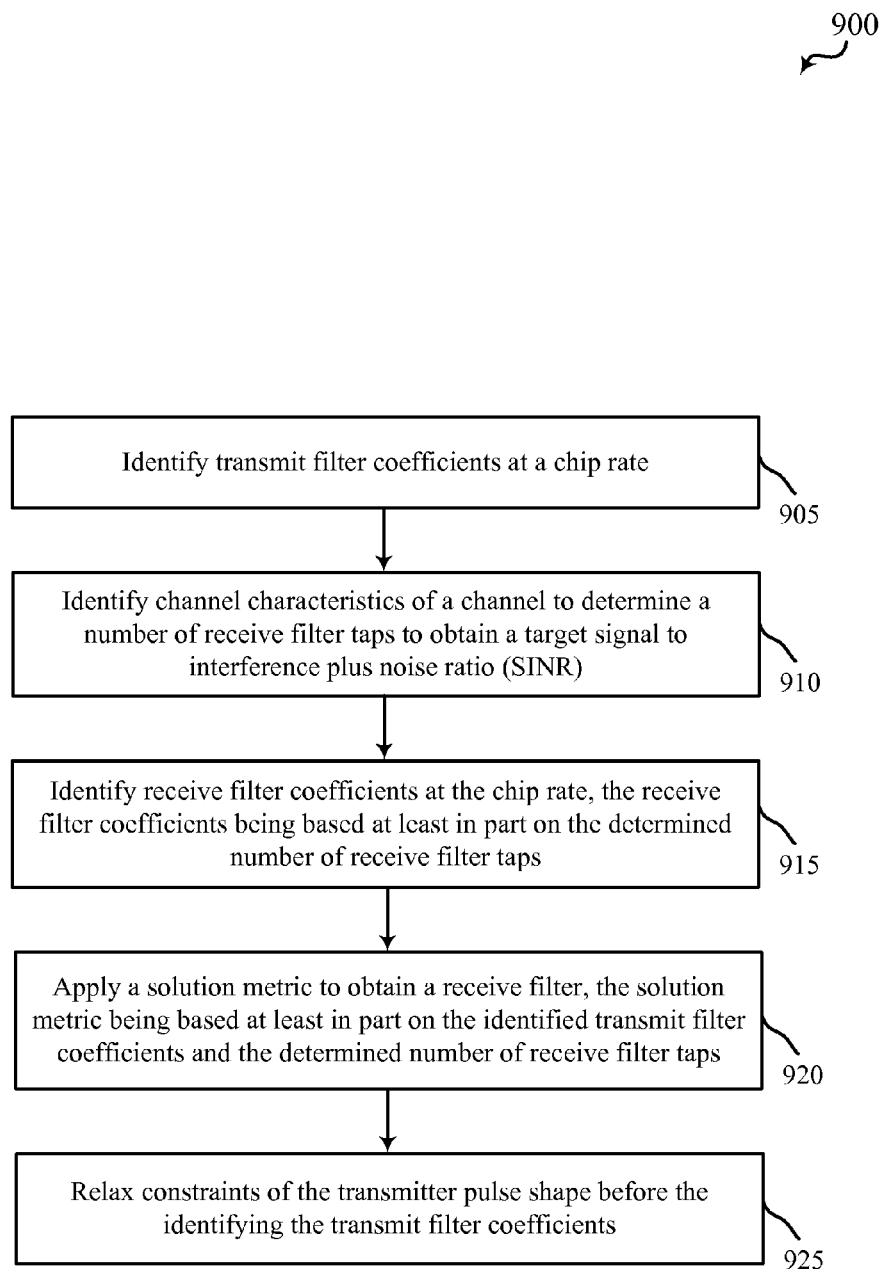
FIG. 9 is a flow diagram of a method of communication with a location tracking system in accordance with various embodiments.

FIG. 9 shows a flow diagram that illustrates a method 900 for communication in a location tracking system, according to some embodiments. In some cases, the method 900 may be implemented using some or all of the devices and systems 100, 200, 200-a, 300, 400, 500, and 600 of FIGS. 1A, 1B, 2A, 2B, 3, 4, 5, and 6.

At block 905, the method may involve minimizing side lobes at a receive filter by identifying transmit filter coefficients at a chip rate. Then, at block 910, it may include identifying channel characteristics of a channel to determine a number of receive filter taps to obtain a target SINR. It may then involve, at block 915, identifying receive filter coefficients at a chip rate. The receive filter coefficients may be based on the determined number of receive filter taps. At block 920, the method may include applying a solution metric to obtain a receive filter. In some case, the solution metric is based on the identified transmit filter coefficients and the determined number of receive filter taps. Then, at block 925, it may include relaxing constraints of the transmitter pulse shape before the identifying the transmit filter coefficients.

One skilled in the art will recognize that the method 900 is just one implementation of the tools and techniques described herein. The operations of the method 900 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method to minimize side lobes at a receive filter, comprising:
   identifying transmit filter coefficients at a chip rate;
   identifying channel characteristics of a channel to determine a number of receive filter taps to obtain a target signal to interference plus noise ratio (SINR);
   identifying receive filter coefficients at the chip rate, the receive filter coefficients being based at least in part on the determined number of receive filter taps; and
   applying a solution metric to obtain the receive filter, the solution metric being based at least in part on the identified transmit filter coefficients and the determined number of receive filter taps.

2. The method of claim 1, further comprising:
   adjusting the number of receive filter taps to obtain a set of receive filters, the set of receive filters comprising the receive filter; and
   selecting an optimal receive filter from the set of receive filters, each receive filter of the set of receive filters comprising a respective energy loss and a respective side lobe power, the selection of the optimal receive filter being based at least in part on the respective energy loss and the respective side lobe power.

3. The method of claim 2, further comprising:
   applying the optimal receive filter to an ultra-wideband (UWB) signal in a discrete time domain after analog to digital conversion of the UWB signal.

4. The method of claim 2, wherein the optimal receive filter corresponds to a minimum side lobe power.

5. The method of claim 2, wherein the optimal receive filter corresponds to minimum energy loss.

6. The method of claim 1, further comprising:
   relaxing constraints of a transmitter pulse shape before the identifying the transmit filter coefficients.

7. The method of claim 6, wherein relaxing constraints of the transmitter pulse shape comprises maximizing transmit power.

8. The method of claim 1, wherein the solution metric comprises a least square solution.

9. The method of claim 1, wherein the identified receive filter coefficients comprise a quantity less than or equal to the number of receive filter taps.

10. A system configured for minimizing side lobes at a receive filter, the system comprising:
    means for identifying transmit filter coefficients at a chip rate;
    means for identifying channel characteristics of a channel to determine a number of receive filter taps to obtain a target signal to interference plus noise ratio (SINR);
    means for identifying receive filter coefficients at the chip rate, the receive filter coefficients being based at least in part on the determined number of receive filter taps; and
    means for applying a solution metric to obtain the receive filter, the solution metric being based at least in part on the identified transmit filter coefficients and the determined number of receive filter taps.

11. The system of claim 10, further comprising:
    means for adjusting the number of receive filter taps to obtain a set of receive filters, the set of receive filters comprising the receive filter; and
    means for selecting an optimal receive filter form the set of receive filters, each receive filter of the set of receive filters comprising a respective energy loss and a respective side lobe power, the selection of the optimal receive filter being based at least in part on the respective energy loss and the respective side lobe power.

12. The system of claim 11, further comprising:
    means for applying the optimal receive filter to an ultra-wideband (UWB) signal in a discrete time domain after analog to digital conversion of the UWB signal.

13. The system of claim 11, wherein the optimal receive filter corresponds to a minimum side lobe power.

14. The system of claim 10, wherein the optimal receive filter corresponds to minimum energy loss.

15. The system of claim 10, further comprising:
    means for relaxing constraints of a transmitter pulse shape.

16. The system of claim 15, wherein the means for relaxing the constraints of the transmitter pulse shape comprises means for maximizing transmit power.

17. The system of claim 10, wherein the solution metric comprises a least square solution.

18. An apparatus for minimizing side lobes at a receive filter, the apparatus comprising:
a processor;
memory in electronic communication with the processor; and
instructions stored in the memory, the instructions being executable by the processor to:
identify transmit filter coefficients at a chip rate;
identify channel characteristics of a channel to determine a number of receive filter taps to obtain a target signal to interference plus noise ratio (SINR);
identify receive filter coefficients at the chip rate, the receive filter coefficients being based at least in part on the determined number of receive filter taps; and
apply a solution metric to obtain the receive filter, the solution metric being based at least in part on the identified transmit filter coefficients and the determined number of receive filter taps.

19. The apparatus of claim 18, wherein the instructions are further executable by the processor to:
adjust the number of receive filter taps to obtain a set of receive filters, the set of receive filters comprising the receive filter; and
select an optimal receive filter from the set of receive filters, each receive filter of the set of receive filters comprising a respective energy loss and a respective side lobe power, the selection of the optimal receive filter being based at least in part on the respective energy loss and the respective side lobe power.

20. The apparatus of claim 19, wherein the instructions are further executable by the processor to:
apply the optimal receive filter to an ultra-wideband (UWB) signal in a discrete time domain after analog to digital conversion of the UWB signal.

21. The apparatus of claim 19, wherein the optimal receive filter corresponds to minimum side lobe power.

22. The apparatus of claim 19, wherein the optimal receive filter corresponds to minimum energy loss.

23. The apparatus of claim 18, wherein the instructions are further executable by the processor to:
relax constraints of a transmitter pulse shape before identifying the transmit filter coefficients.

24. The apparatus of claim 23, wherein the instructions are further executable by the processor to:
relax constraints of the transmitter pulse shape so as to maximize transmit power.

25. The apparatus of claim 18, wherein the solution metric comprises a least square solution.

26. The apparatus of claim 18, wherein the identified receive filter coefficients comprise a quantity less than or equal to the number of receive filter taps.

27. A computer-program product for minimizing side lobes at a receive filter, the computer-program product comprising a non-transitory computer-readable medium storing instructions executable by a processor to:
identify transmit filter coefficient at a chip rate;
identify channel characteristics of a channel to determine a number or receive filter taps to obtain a target signal to interference plus noise ratio (SINR);
identify receive filter coefficients at the chip rate, the receive filter coefficients being based at least in part on the determined number of receive filter taps; and
apply a solution metric to obtain the receive filter, the solution metric being based at least in part on the identified transmit filter coefficients and the determined number of receive filter taps.

28. The computer-program product of claim 27, wherein the instructions are further executable by the processor to:
adjust the number of receive filter taps to obtain a set of receive filters, the set of receive filters comprising the receive filter; and
select an optimal receive filter from the set of receive filters, each receive filter of the set of receive filters comprising a respective energy loss and a respective side lobe power, the selection of the optimal receive filter being based at least in part on the respective energy loss and the respective side lobe power.

29. The computer-program product of claim 28, wherein the instructions are further executable by the processor to:
apply the optimal receive filter to an ultra-wideband (UWB) signal in a discrete time domain after analog to digital conversion of the UWB signal.

30. The computer-program product of claim 28, wherein the optimal receive filter corresponds to minimum side lobe power.

31. The computer-program product of claim 28, wherein the optimal receive filter corresponds to minimum energy loss.

32. The computer-program product of claim 27, wherein the instructions are further executable by the processor to:
relax constraints of a transmitter pulse shape before identifying the transmit filter coefficients.

33. The computer-program product of claim 32, wherein the instructions are further executable by the processor to:
relax constraints of the transmitter pulse shape so as to maximize transmit power.

34. The computer-program product of claim 27, wherein the solution metric comprises a least square solution.

35. The computer-program product of claim 27, wherein the identified receive filter coefficients comprise a quantity less than or equal to the number of receive filter taps.

* * * * *